United States Patent [19]

Ho

[11] Patent Number: 4,776,021
[45] Date of Patent: Oct. 4, 1988

[54] SPEED COMPENSATION SCHEME FOR READING MICR DATA

[75] Inventor: Benedict C. M. Ho, Waterloo, Canada

[73] Assignee: NCR Corporation, Dayton, Ohio

[21] Appl. No.: 121,372

[22] Filed: Nov. 16, 1987

[51] Int. Cl.⁴ .............................................. G06K 9/18
[52] U.S. Cl. ........................................ 382/7; 382/11; 235/474
[58] Field of Search ............... 382/7, 11, 61; 235/436, 235/474

[56] References Cited

U.S. PATENT DOCUMENTS

| | | | |
|---|---|---|---|
| 3,316,536 | 4/1967 | Andrews et al. | 382/7 |
| 3,528,058 | 9/1970 | Bond | 382/7 |
| 4,015,701 | 4/1977 | Templeton | 101/91 |
| 4,127,770 | 11/1978 | Baader | 235/474 |
| 4,143,355 | 3/1979 | MacIntyre | 340/146.3 C |
| 4,143,356 | 3/1979 | Nally | 340/146.3 C |
| 4,148,010 | 4/1979 | Shiau | 382/7 |
| 4,547,899 | 10/1985 | Nally et al. | 382/7 |
| 4,679,744 | 7/1987 | Chikamasa et al. | 382/1 |

Primary Examiner—Leo H. Boudreau
Assistant Examiner—Donald J. Daley
Attorney, Agent, or Firm—Wilbert Hawk, Jr.; Albert L. Sessler, Jr.; Elmer Wargo

[57] ABSTRACT

A method and apparatus for providing a speed compensation scheme for reading MICR data on a document. The magnetic waveform for a character is sampled at periodic rates and converted to first bytes of data which are placed in a first memory. The velocity of the document is sampled at second periodic rates and the instantaneous values of the speed of the document are placed in a second memory as second bytes of data. A processor is used to remove the second bytes of data from memory and to calculate an average speed of the document for an associated examining window consisting of a predetermined number of the first bytes of data. The width of the examining window is adjusted in accordance with the average speed compared to an anticipated normal speed.

6 Claims, 4 Drawing Sheets

FIG. 5

| | | | | | | | | |
|---|---|---|---|---|---|---|---|---|
| 0\|1 | 24\|25 | 56\|57 | 88\|89 | 120\|121 | 152\|153 | 184\|185 | 216\|217 | 248\|249 ← TOTAL DATA SAMPLE |
| ① | ② | ③ | ④ | ⑤ | ⑥ | ⑦ | ⑧ | ← WINDOW NUMBER |
| 24 | 32 | 32 | 32 | 32 | 32 | 32 | 32 | ← NEW WINDOW WIDTH @ NORMAL SPEED (SAMPLES) |
| 6 | 8 | 8 | 8 | 8 | 8 | 8 | 8 | ← OLD WINDOW WIDTH (SAMPLES) |

FIG. 7

| | | | | | | | | |
|---|---|---|---|---|---|---|---|---|
| +5% | +10% | +15% | +10% | +5% | 0% | -5% | -10% | ← MEASURED SPEED CHANGE IN EACH WINDOW |
| 0 | 23\|24 | 52\|53 | 80\|81 | 109\|110 | 139\|140 | 171\|172 | 205 | 241 ← DATA SAMPLE |
| ① | ② | ③ | ④ | ⑤ | ⑥ | ⑦ | ⑧ | |
| 23 | 29 | 28 | 29 | 30 | 32 | 34 | 36 | ← ADJUSTED WINDOW WIDTH BASED ON SPEED CHANGE (SAMPLES) |

SPEED COMPENSATION SCHEME FOR READING MICR DATA

BACKGROUND OF THE INVENTION

This invention relates to a method and apparatus for providing a speed compensation scheme for reading MICR data.

In conventional Magnetic Ink Character Recognition (MICR) systems, like E13B for example, characters encoded on a document are read by moving the document in reading relationship with a read head to produce a magnetic waveform which corresponds to the character being read. A character is recognized by dividing the waveform into sections or windows, with the features of the waveform within each window being compared with a stored template for character recognition. If there are changes in the speed of the document as it is being moved past the read head, the features of the waveform may not fall within the expected windows, and consequently, the character being read will be rejected as a reject.

Expensive, constant velocity motors are often used to provide a constant velocity for moving the document past the read head. Another prior art system utilizes a timing disc to provide clocking pulses related to the velocity of document being moved past the read head.

SUMMARY OF THE INVENTION

The present invention provides a faster response time for adjusting changes in the velocity of the document being read compared to some of the prior art methods.

The present invention also provides a faster response time when compared to phase-lock loop systems.

In contrast with the prior art schemes mentioned, a preferred embodiment of the apparatus of the present invention includes: reading means for reading magnetic characters on a document at said reading station; moving means for moving said document in reading relationship with said reading means to produce magnetic waveforms corresponding to the characters being read; an analog to digital converter for converting the magnetic waveform associated with a character into binary data; sampling means for sampling said binary data at periodic times to produce first bytes of data representing said magnetic waveform; a first memory means for storing said first bytes of data; velocity sensing means for sensing the velocity of said document at said reading means at periodic times to produce second bytes of data representing instantaneous velocities of said document at said reading means; a second memory means for storing said second bytes of data; a predetermined number of said first bytes of data representing a window of a plurality of windows used in examining said magnetic waveforms, with said predetermined number occurring when the speed of a document at said reading station is an anticipated normal speed; a predetermined number of said second bytes of data being associated with said predetermined number of first bytes of data; and processor means for withdrawing a predetermined number of said second bytes of data from said second memory and for calculating an average speed therefrom, whereby said average speed is compared with said anticipated normal speed to obtain a variation in speed, if any; said variation in speed from said anticipated normal speed being used to adjust the predetermined number of said first bytes of data associated with a window to arrive at an adjusted window; and said processor means also having means for examining said second bytes of data in said adjusted window for peaks for use in template matching.

In another aspect, this invention includes the method of reading magnetic characters on a document comprising the steps: (a) moving a document in reading relationship with a reading means to generate a magnetic waveform corresponding to a character to be read on the document; (b) converting the magnetic waveform into a plurality of bytes of data corresponding to said magnetic waveform; (c) sampling said bytes of data at periodic times to produce first bytes of data corresponding to said magnetic waveform, with a predetermined number of said first bytes of data corresponding to an examining window of a plurality of examining windows when the document is moved at an anticipated velocity in reading relationship with said reading means; (d) storing said first bytes of data in a first memory; (e) periodically sensing the velocity of said document at said reading means to produce second bytes of data representing instantaneous velocities of said document at said reading means so that a predetermined number of second bytes of data correspond to a said examining window of said plurality of windows when the document is moved at said anticipated velocity; (f) storing said second bytes of data in a second memory; (g) calculating the average velocity of said document at said reading means from said predetermined number of second bytes of data; and (h) adjusting the width of a said examining window compared to its associated said predetermined number of first bytes by changing the number of first bytes included in the examining window in accordance with a comparison of said average velocity with said anticipated velocity; and (i) examining the first bytes of data within the adjusted examining window of step h for peaks for use in template matching.

The present invention is also inexpensive.

These advantages and others will be more thoroughly understood in connection with the following description, claims, and drawing.

BRIEF DESCRIPTION OF THE DRAWING

FIG. 5 is a chart showing the relationship of various elements associated with a character when that character is being read at a normal speed;

FIG. 7 is a chart showing the relationship of speed changes of the document with adjusted examining windows.

DETAILED DESCRIPTION OF THE INVENTION

Figure 1:
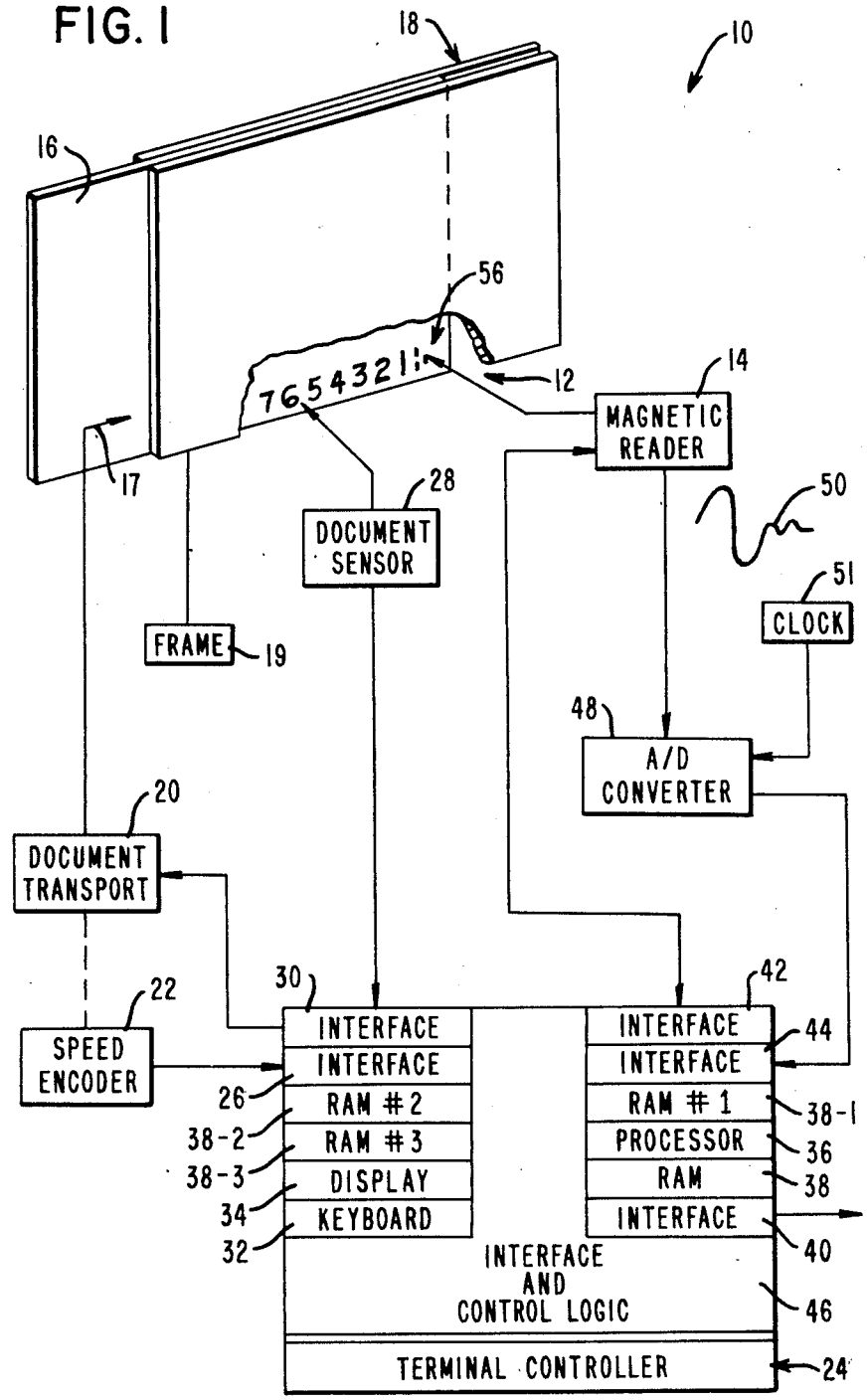
FIG. 1 is a schematic view of the apparatus of this invention.

FIG. 1 is a schematic view of the apparatus of this invention which is designated generally as 10. The apparatus 10 includes a reading station 12 at which a conventional magnetic reader 14 is situated. A document 16 to be read is moved in a document track 18 (mounted in frame 19) by a conventional moving means or a document transport 20 which moves the document 16 (along the direction of arrow 17) in reading relationship with the magnetic reader 14. The apparatus 10 may be part of a business machine, like an encoder, which reads MICR data on a check, for example, and prints at least some of the data read on the document 16 itself at a subsequent station (not shown).

The apparatus 10 also includes a speed encoder 22 which provides instantaneous velocity information about the speed of a document 16 as it is moved in operative relationship with the magnetic reader, as will be described hereinafter. For the moment, it is sufficient to state that the speed encoder is operatively connected to the document transport 20 and that the output from the speed encoder 22 is fed to a terminal controller 24, associated with the apparatus 10, via a conventional interface 26. A document sensor 28, positioned along the document track 18, has its output forwarded to the terminal controller 24, via a conventional interface 30, to give an indication of document 16 approaching the reading station 12.

The terminal controller 24 itself is conventional; however, it is configured in FIG. 1 to show the functional relationships among the different elements shown, with the actual controller being different from the schematic representation shown. The terminal controller 24 represents the processing means for performing various operations to be later described herein. The terminal controller 24 includes a keyboard (K.B.) 32, a display 34, a processor 36, a RAM 38, a RAM #1 (38-1), a RAM #2 (38-2), a RAM #3 (38-3), various interfaces 40, 42, and 44, and interface and control logic 46 which are all interconnected to enable the terminal controller 24 to function as an intelligent terminal. The interface 40 may be used to load a software routine into the terminal controller 24 from an external source (not shown) or the interface 40 may be used to couple the terminal controller 40 to a host controller (not shown).

The apparatus 10 also includes an analog/digital converter 48 for converting the magnetic waveforms 50 produced by the magnetic reader 14 into bytes of data representing the various magnetic waveforms 50. A sampling means, including the clock 51 and the terminal controller 24, samples the data from the A/D converter 48 at periodic times to produce first bytes of data corresponding to the magnetic waveform 50. In the embodiment being described, there are six first bytes of data associated with examination window #1 shown in FIG. 2 and eight first bytes of data associated with examination windows #2–#8, although a different predetermined number may be used for different applications.

Figure 2:
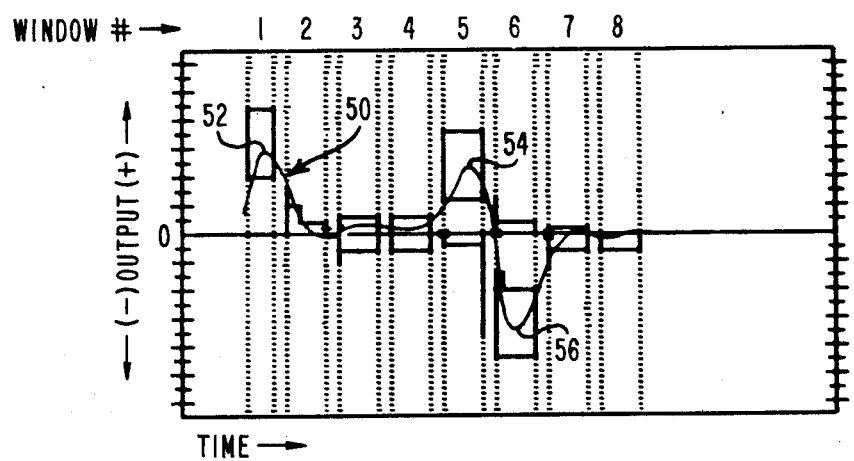
FIG. 2 is a chart showing a magnetic waveform and the associated examining windows when a document is moving past a magnetic reader at a normal speed.

The examination windows mentioned in the previous paragraph may be more readily understood in connection with FIG. 2 which shows a magnetic waveform 50 for a character of data when the document travels at the normal or anticipated speed past the magnetic reader 14. Notice that there are eight windows or time slots used to examine a waveform which comprises a character to be recognized, with the windows being numbered 1 through 8 in FIG. 2. The positive peaks like 52 and 54 within windows #1 and #5 and the negative peak #56 within window #6, along with the lack of peaks in the remaining windows, are used to identify a character as is conventionally done. The peak areas and no peak areas under consideration are shown in quadrilaterals in FIG. 2 to highlight them. In other words, the template shown in FIG. 2 is matched with a template stored, for example, in the RAM 38 of the terminal controller 24. When a match occurs, the character is identified. If no match occurs, the character under consideration is rejected as a reject. A template is a pattern of peaks or no peaks within the time slots or windows as conventionally used.

Figure 3:
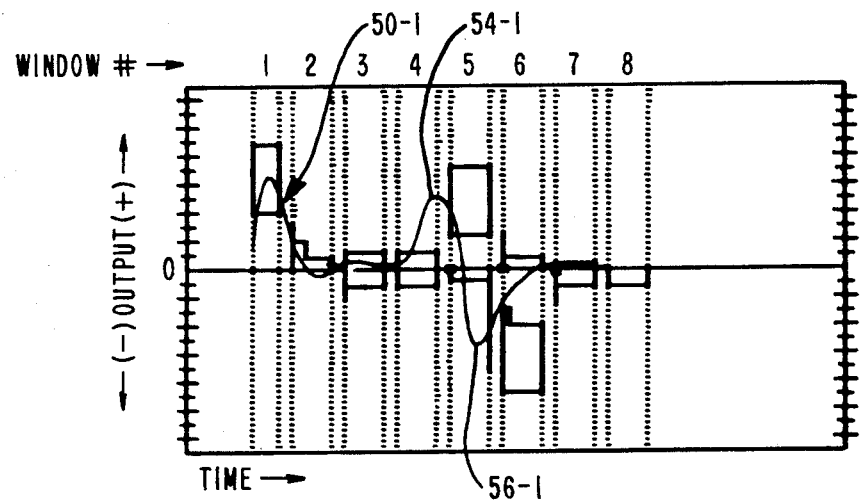
FIG. 3 is a chart similar to FIG. 2 showing the waveform for the same character when the document is moving past the magnetic reader at a speed which is faster than the normal anticipated speed.

FIG. 3 shows a situation in which the document 16 passes the magnetic reader 14 at a speed which is much faster than normal. Notice that the waveform 50-1 for the character being read is more compressed with regard to time than the waveform 50 (FIG. 2) for the same character. Notice, also, how the peaks 54-1 and 56-1 have shifted with regard to their expected windows #5 and #6, respectively.

The characters like those shown on a document 16 are read from right to left as viewed in FIG. 1. It is characteristic of E13B MICR data mentioned earlier herein that each character starts with the associated waveform beginning in the positive direction as shown by peak 52 in FIG. 2

Before describing in detail how the apparatus 10 functions, it is useful to discuss, generally, how it operates. As previously stated, there are six first bytes of data associated with window #1, and there are eight first bytes of data which are associated with each of the windows #2–#8 when the document is moving at the normal speed. These first bytes of data are sampled at a first clock rate using the clock 51 as previously described. The speed encoder 22 is conventional and uses a timing disc and a light and detector combination (not shown) to provide second bytes of data to the terminal controller 24 to give an indication of the instantaneous velocity of document 16 as it passes the magnetic reader 14. The instantaneous velocity of the document 16 is sampled at a second clock rate which is four times as slow as the first clock rate. In other words, there are four first bytes of data generated for each second byte of data. The first bytes of data from the A/D converter 48 are stored in RAM #1 of the terminal controller 24, and the second bytes or speed data are stored in RAM #2. It is not necessary that there be a one-to-one correspondence between the first bytes and the second bytes for a particular window. In the embodiment described, one second or speed byte was considered adequate for every four first bytes of data from the A/D converter 48 for checking on possible changing velocities of the document 16. The eight first bytes of data for one of the windows #2–#8 are produced in one millisecond in the embodiment described; that is the time that one of these windows moves past the magnetic reader 14 when the document is moving at the normal expected speed. If, however, the document 16 moves faster than expected, it may take only 0.8 millisecond for one of the windows #2–#8 to move past the magnetic reader 14. This would indicate that perhaps seven first bytes of data instead of eight should be included in the corresponding window. The eighth first byte of data should be included in the next adjacent window in the example being described. In an intended design, the speed will be 5 milliseconds per character or approximately 0.65 milliseconds per window.

During the operation of the apparatus 10, the A/D converter 48 and the clock 51 run all the time when the apparatus 10 is turned on; however, it is up to the terminal controller 24 to decide when to start taking samples of data from the A/D converter 48 and the speed encoder 22. The decision as to when to start taking samples is determined, conventionally, by the terminal controller 24 and is based on a time delay determined after a signal is received from the document sensor 28. The time delay may be with regard to the leading edge of the document 16 or with regard to "start" characters shown only by position arrow 56 in FIG. 1.

Figure 4:
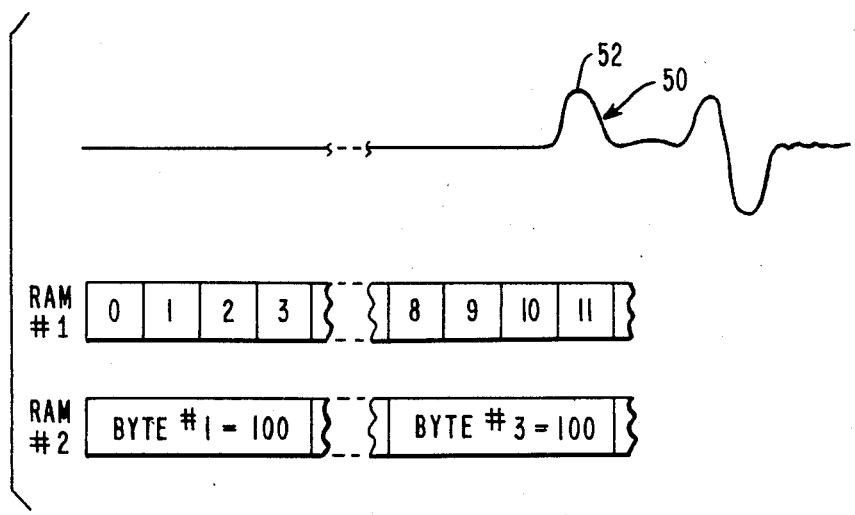
FIG. 4 is a diagram showing the relationship between data about a waveform and associated locations in memory.

Once the terminal controller 24 starts to take samples, the samples from the A/D converter 48 are taken at the rate of clock 51, and these samples are placed in RAM #1 in the locations marked as 0 . . . through 11, for example, in FIG. 4. Each location in RAM #1 stores an eight bit byte of data which corresponds to the magnitude of the waveform 50 which is positioned in FIG. 4 only to show a general correlation between the waveform 50 and RAM #1. For example, in the embodiment shown, the first 10 memory locations in RAM #1 each contain a byte of data which is zero because the corresponding portions of the waveform 50 which are located directly above memory locations are zero. Once the magnitude of the waveform exceeds a certain threshold level, the associated eight bit byte, not a zero, would be placed in the corresponding location in RAM #1; in the example being described, the byte associated with a portion of peak 52 would be placed in location #11 in RAM #1. The memory locations in RAM #1 and the waveform 50 are not drawn to scale in FIG. 4; they are drawn only to illustrate the general relationship with each other.

At the same time that data about the waveform 50 is being placed in RAM #1 as just described, data about the speed of the document 16 is being placed in RAM #2. As previously stated, the speed encoder 22 is conventional, and it includes a slotted timing disc and sensor (not shown) which produce pulses in timed relationship with the speed of the document 16 moving in the track 18. These pulses are used, conventionally, with a counter circuit (not shown) to produce a count which reflects the speed of the document. As an illustration, when the document 16 is moving at the normal anticipated speed, the count may be 100 between successive second clocks. If the document is moving faster than normal, the count may be 105, for example, between successive second clocks. This normal speed count of 100, which is shown as Byte #1 in FIG. 4, is placed in the first memory location in RAM #2. In the embodiment described, one speed byte, like Byte #1, exists for four bytes of waveform magnitude data in RAM #1. Speed Byte #3 in FIG. 4 is associated with the waveform magnitude data in locations 8–11 in RAM #1.

FIG. 5 is a chart showing the correlation among various elements to be described for a character to be read when the document 16 is moving at a normal speed past the magnetic reader 14. As stated earlier herein, there are eight examining windows which are used in identifying a character according to the E13B font being described, and these eight windows are shown as #1–#8, with each number being enclosed in a circle. The numbers across the top of the chart ranging from 0–248 represent the total data sample for a character when the associated document 16 is moving at the normal anticipated speed. Window #1 has 24 sample bytes associated with it, ranging from sample #1 through sample #24. Correspondingly, window #2 has 32 sample bytes, ranging from 25–56, and window #8 has 32 sample bytes, ranging from 217–248.

The first window width in FIG. 5 is shorter (24 samples) than the rest of the window widths (32 samples) for a particular reason. This is due to the nature of the E13B font being discussed. According to this font, the first portion of the magnetic waveform, like 50, always produces a positive peak 52. Due to the first portion of a character being positive, the threshold value of the signal in the reader 14 will be exceeded in a relatively short time when compared to the remaining peaks in the character because these other peaks may be going down through the zero point in a negative direction and then up through the zero point in a positive direction. Accordingly, 24 samples are used for the first window, and 32 samples are used for the remaining windows #2–#8. Notice from the bottom line in FIG. 5 that the old window width is represented as 6 samples for the first window and 8 samples for the remaining windows when the document is moving at the normal speed. The samples of 24 for the first window and 32 for the remaining windows correspond to the values for the old windows except that they are multiplied by a factor of 4 to obtain better resolution as will become apparent from some of the calculations to be discussed later herein. For example, the old window value of six was multiplied by four to obtain the new window value of 24 samples for the width of window #1.

In processing the data being placed in RAM #1 and RAM #2, it is convenient to think of all the data for a document being read to be placed in these RAMs before the processing of any character within a line of characters on the document 16 is begun. In actuality, the terminal controller 24 controls the placing of data in the RAMs #1 and #2, and it controls the processing of this data in an interlaced mode before all the characters in a line of characters are read so as to maximize the use of the terminal controller 24, as is conventionally done. However, for the purpose of explanation, the processing will be explained as though all the characters in a line of characters on a document are read before the processing of data is begun.

Figure 6:
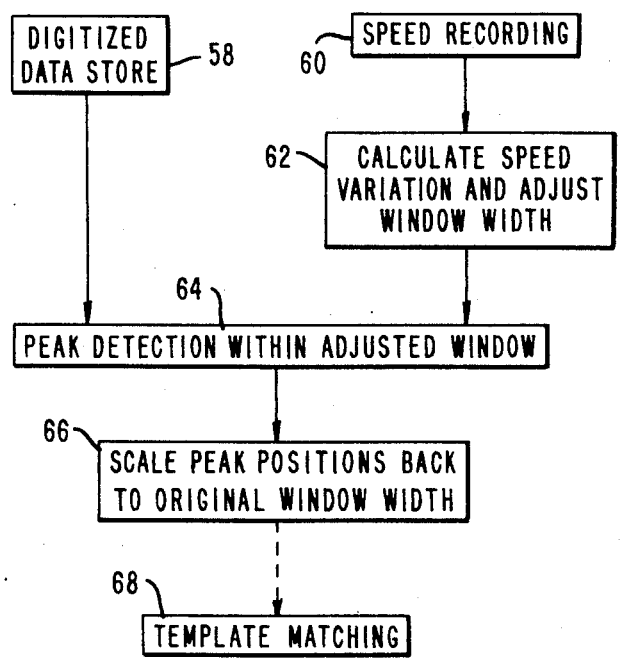
FIG. 6 is a flow chart showing the method steps according to this invention.

In this regard, FIG. 6 shows how the processing of data is done. Step 58 of digitizing and storing the data relating to the samples of the magnetic waveform 50 has already been discussed in relation to FIG. 4. Similarly, the step 60 of recording the speed of the document 16 as it is moved past the magnetic reader 14 has also been discussed. The next step 62 to be performed in the process of this invention is to calculate the speed variation (if present) of a document 16 past the magnetic reader 14 and to adjust the widths of the windows affected, when necessary.

As stated earlier herein, there is one speed sample, like Byte #1 in FIG. 4, for each four data samples being fed into the RAM #1. It should also be recalled that the first sample of data associated with the magnetic waveform 50 which exceeded the threshold occurred at memory location 11 in the example described in FIG. 4. This means that if the document 16 is travelling at the normal anticipated speed, the data samples associated with this character would be located in memory locations 11 through 259 instead of the locations 1 through 248 shown in FIG. 5. However, to simplify the explanation, the starting at location 11 in RAM #1 may be considered as an offset of 11 as is typically done in processing in order to enable the explanation to proceed from memory locations #1–#248 shown in FIG. 5.

Continuing with an explanation of step 62 shown in FIG. 6, the calculation for the speed variation is performed as follows. Assume that the speed of the document 16 past the magnetic reader 14 is faster than normal. This means that the four counts associated with the first window in FIG. 7 would be, for example, 105, 105, 105, and 105. These four counts are averaged to produce an average value of 105; this means that the document 16 is travelling +5% faster than the normal speed represented by a count of 100. This value of +5% is shown as the measured speed change associated with window #1 in FIG. 7. Because the document 16 is travelling +5% faster than normal, the width of window #1 will be adjusted to be 95% of the normal width or. 0.95×24 which is equal to 23. This means that the bytes of data samples in memory locations #1–#23 of RAM #1 (FIG. 4) are associated with window #1. Each window number in FIG. 7 is enclosed in a circle as was done in FIG. 5. Suppose that the next four speed bytes (like Byte #1 in RAM #2) indicate that the document is moving at a speed which is 10% faster than normal. In this example, the width of window #2 will be adjusted to be 90% of the normal width or 0.90×32 which is equal to 29. This means that the bytes of data associated with memory locations #24–#52 are associated with window #2 in FIG. 7. The adjustments to the remaining windows #3–#8 are similarly calculated.

Certain aspects should be mentioned with regard to the adjusted window widths shown in FIG. 7 when compared with the window widths #1–#8 derived from the normal speed of the document past the magnetic reader 14. In this regard, the overall length of the windows in FIG. 7 is 241 as compared with the normal overall length of 248 shown in FIG. 5. It follows, then, that the total of 241 samples compared with 248 samples as the base gives a speed variation, overall, of about 3%. Notice in the example shown in FIG. 7 that the document speed varies from 0% to +15% to a −10% for the eight windows. Notice that while the overall variation for the entire eight windows is not very large, there is a great amount of variation from window to window.

After the eight window widths have been adjusted as discussed in relation to step 62 in FIG. 6 and FIGS. 5 and 7, the next step 64 is to perform peak detection within the adjusted windows shown in FIG. 7. As an illustration, the bytes of data which are located in RAM #1 at locations #1–#23 thereof (from FIG. 7) are examined, conventionally, by software associated with the terminal controller 24 to determine whether or not a peak exists therein. Assume that a positive peak is found at location #13 in window #1 and its magnitude is 10. The magnitude of the peak and its location are placed in RAM #3 (also shown as RAM 38-3 in FIG. 1) in the following format:

Window #1, +Peak, [Amplitude] [Location]
Window #1, −Peak, [Amplitude] [Location]
Window #2, +Peak, [+Amplitude] [Location]
Window #2, −Peak, [Amplitude] [Location].

The data about the remaining windows #3–#8 are similarly formatted. As an illustration, the assumed data about window #1 would be formatted as follows:
Window #1, +Peak, [10] [13]
Window #1, −Peak, [0] [0.

After the data about the magnetic waveform 50 is placed in RAM #3 as just described, the next operation to be performed is that of scaling the peak positions back to the original window width as shown by step 66 in FIG. 6. Changing the window width from eight samples to 32 samples, for example, was done to obtain better resolution as discussed in relation to FIG. 5.

Now, the window width must be scaled back to fit the general format of six samples for the shortened window #1 and eight samples for the windows #2–#8 in order to make it compatible with conventional MICR template matching circuitry. The scaling back operation is performed by the following formula:

Scaled peak position =

$$\text{location of peak} \times \frac{\text{old window width}}{\text{adjusted window width}}.$$

As an illustration, the scaled back peak position (P1) for the peak in window #1 is determined as follows:

$$P1 = 13 \times \frac{6}{23} = 3.$$

The scaled back peak position (P2) for the peak in window #2 (assuming its location in the adjusted window width is 18) is determined as follows:

$$P2 = 18 \times \frac{8}{29} = 5.$$

The remaining peak positions P3–P8 are similarly calculated.

After the peak positions for both positive and negative peaks are calculated as described, the remaining step 68 (FIG. 6) is to perform conventional template matching in which the magnitudes of the peaks and their locations within the adjusted associated windows are used. Because this is conventional, it need not be explained in any further detail.

What is claimed is:
1. An apparatus for reading magnetic characters on a document, comprising:
 reading means for reading magnetic characters on a document at a reading station;
 moving means for moving said document in reading relationship with said reading means to produce magnetic waveforms corresponding to the characters being read;
 an analog to digital converter for converting the magnetic waveform associated with a character into binary data;
 sampling means for sampling said binary data at periodic times to produce first bytes of data representing said magnetic waveform;
 a first memory means for storing said first bytes of data;
 velocity sensing means for sensing the velocity of said document at said reading means at periodic times to produce second bytes of data representing instantaneous velocities of said document at said reading means;
 a second memory means for storing said second bytes of data;
 a predetermined number of said first bytes of data representing a window of a plurality of windows used in examining said magnetic waveforms, with said predetermined number occurring when the speed of a document at said reading station is an anticipated normal speed;
 a predetermined number of said second bytes of data being associated with said predetermined number of first bytes of data; and processor means for withdrawing a predetermined number of said second bytes of data from said second memory and for calculating an average speed therefrom, whereby said average speed is compared with said anticipated normal speed to obtain a variation in speed, if any; said variation in speed from said anticipated normal speed being used to adjust the predetermined number of said first bytes of data associated with a window to arrive at an adjusted window; and said processor means also having means for examining said first bytes of data in said adjusted window for peaks for use in template matching.

2. The apparatus as claimed in claim 1 in which said processor means also includes means for scaling the width of a said adjusted window to make it compatible with known template matching.

3. The apparatus as claimed in claim 2 in which said periodic times of said sampling means and said velocity sensing means are in a ratio of four to one, with the periodic times of said sampling means occurring more frequently.

4. A method of reading magnetic characters on a document comprising the steps:
   (a) moving a document in reading relationship with a reading means to generate a magnetic waveform corresponding to a character to be read on the document;
   (b) converting the magnetic waveform into a plurality of bytes of data corresponding to said magnetic waveform;
   (c) sampling said bytes of data at periodic times to produce first bytes of data corresponding to said magnetic waveform, with a predetermined number of said first bytes of data corresponding to an examining window of a plurality of examining windows when the document is moved at an anticipated velocity in reading relationship with said reading means;
   (d) storing said first bytes of data in a first memory;
   (e) periodically sensing the velocity of said document at said reading means to produce second bytes of data representing instantaneous velocities of said document at said reading means so that a predetermined number of second bytes of data correspond to a said examining window of said plurality of windows when the document is moved at said anticipated velocity;
   (f) storing said second bytes of data in a second memory;
   (g) calculating the average velocity of said document at said reading means from said predetermined number of second bytes of data; and
   (h) adjusting the width of a said examining window compared to its associated said predetermined number of first bytes by changing the number of first bytes included in the examining window in accordance with a comparison of said average velocity with said anticipated velocity; and
   (i) examining the first bytes of data within the adjusted examining window of step h for peaks for use in template matching.

5. The method as claimed in claim 4 in which said sampling step is effected using a rate which is a predetermined multiple of the rate of sensing the velocity of said document.

6. The method as claimed in claim 5 in which said examining step includes the step of scaling the width of the adjusted examining window so as to make it compatible with existing template matching techniques.

* * * * *